United States Patent [19]
Black et al.

[11] Patent Number: 5,786,104
[45] Date of Patent: Jul. 28, 1998

[54] METHOD AND APPARATUS FOR HUMIDIFICATION OF INCOMING FUEL CELL PROCESS GASES

[75] Inventors: Lance L. Black, Richwood; Keith R. Plowman, Lake Jackson, both of Tex.

[73] Assignee: The Dow Chemical Company, Midland, Mich.

[21] Appl. No.: 775,658

[22] Filed: Dec. 31, 1996

[51] Int. Cl.[6] ............................................. H01M 8/04
[52] U.S. Cl. ........................... 429/13; 429/25; 429/30; 180/65.3
[58] Field of Search .................. 429/13, 25, 30; 180/65.3

[56] References Cited

U.S. PATENT DOCUMENTS

| | | | |
|---|---|---|---|
| 4,530,886 | 7/1985 | Sederquist | 429/13 |
| 4,973,530 | 11/1990 | Vanderborgh et al. | 429/13 |
| 5,200,278 | 4/1993 | Watkins et al. | 429/24 |
| 5,382,478 | 1/1995 | Chow et al. | 429/30 X |
| 5,432,020 | 7/1995 | Fleck | 429/13 |
| 5,564,827 | 10/1996 | Signer | 366/336 |
| 5,605,770 | 2/1997 | Andreoli et al. | 429/25 X |

*Primary Examiner*—Stephen Kalafut
*Attorney, Agent, or Firm*—Ann K. Galbraith

[57] ABSTRACT

A fuel gas and an oxidant gas are humidified using a flow transmitter and a static mixer to achieve saturation of fuel and oxidant process gases prior to feeding to a fuel cell.

12 Claims, 1 Drawing Sheet

METHOD AND APPARATUS FOR HUMIDIFICATION OF INCOMING FUEL CELL PROCESS GASES

BACKGROUND OF THE INVENTION

The present invention relates to electrochemical fuel cells and fuel cell batteries. More particularly, the present invention relates to humidification of fuel and oxidant incoming fuel cell process gases.

In the design of electrochemical cells, such as fuel cells and fuel cell batteries of the type wherein a reactant or process gas is conducted to the cells for electrochemical reaction, both thermal and humidity control are dominant factors. Electrochemical fuel cells generate electrical energy by converting the energy derived from a chemical reaction directly into electrical energy. Usually the chemical reaction is the oxidation of a fuel in the fuel cell. A typical fuel cell has an anode, cathode, and an electrolyte. Often the electrolyte is a solid polymer ion-exchange membrane with which the anode and cathode are in intimate electrical contact. In a typical fuel cell, the fuel and oxidant are supplied to the anode and cathode, respectively. At the anode, the fuel permeates the electrode material and reacts at the catalyst layer thereon to form cations which migrate through the electrolyte or solid polymer electrolyte to the cathode. At the cathode, the oxygen-containing gas reacts at the cathode catalyst layer to form anions.

The anions formed at the cathode react with the cations to form a reaction product. The fuel cell generates a useable electrical current which is removed in a circuit connected to the anode and cathode of the fuel cells. The reaction product is removed from the cell. In electrochemical fuel cells in which hydrogen is the fuel and oxygen containing air (or pure oxygen) is the oxidant, a catalyzed reaction at the anode produces hydrogen cations from the fuel supply. An ion-exchange membrane facilitates the migration of hydrogen ions (protons) from the anode to the cathode. In addition to conducting hydrogen cations, the membrane isolates the hydrogen fuel stream from the oxidant gas stream such as air. At the cathode, oxygen reacts at the catalyst layer to form anions. The anions formed at the cathode react with the hydrogen ions that have migrated across the membrane to form liquid water as the reaction product.

The anode and cathode reactions in fuel cells employing hydrogen as the fuel and oxygen as the oxidant are shown in Equations I and II below:

Anode Reaction $H_2 \rightarrow 2H^+ + 2e^-$ (I)

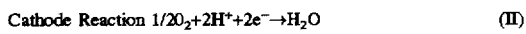

Cathode Reaction $1/2 O_2 + 2H^+ + 2e^- \rightarrow H_2O$ (II)

Fuel cells employing solid polymer electrolytes generally contain a membrane and an electrode assembly consisting of a solid polymer electrolyte (ion-exchange membrane) located between two electrodes formed of porous, electrically-conductive sheet material. Electrodes are typically formed of carbon fiber paper, and are generally impregnated or coated with a hydrophobic polymer such as polytetrafluoroethylene. The membrane and electrode assembly contains a layer of catalyst at each membrane/electrode interface to catalyze the electrochemical reaction occurring on the electrode. Finely-divided platinum is typically employed as a catalyst. Two electrically-conductive plates are disposed on either side of the membrane and electrode assembly. The plates are typically formed of graphite and serve as current collectors. The electrodes are electrically coupled to a circuit so as to provide a path for conducting electrons produced by the reaction in the fuel cell.

Two or more fuel cells can be connected in series or in parallel to increase the overall power output of the fuel cell power generation system. The cells are usually connected in series wherein one side of a given electrically-conductive plate is in contact with the membrane and electrode assembly and serves as an anode plate for one cell and the other side of the same plate serves as the cathode plate for the adjacent cell. Such a series of connected fuel cells is referred to as a "fuel cell stack" and is usually held together by tie rods and end plates. The stack typically includes feed manifolds or inlets for directing the fuel and the oxidant to the anode and the cathode. The stack usually includes a feed manifold or inlet for directing the coolant fluid, typically water, to interior channels within the fuel cell stack in order to absorb heat generated by the exothermic reaction of hydrogen and oxygen within the fuel cells. The stack also, generally, includes exhaust manifolds or outlets for expelling the unreacted fuel and the oxygen gases and for carrying away the water produced in the reaction as well as an outlet manifold for the coolant water exiting the stack.

The ion-exchange membranes used in fuel cells can be perfluorosulfonic acid ion-exchange membranes such as those sold by DuPont under the tradename NAFION™. Such membranes must be hydrated or saturated with water molecules for ion transport to occur and prior to installation in the fuel cell are usually hydrated by boiling in water. It is believed that the perfluorosulfonic acid ion-exchange membrane transports cations using a mechanism that has been termed "water pumping". This mechanism involves the transport of cations together with water molecules and results in a net flow of water from the anode side of the membrane to the cathode side. Membranes exhibiting this mechanism can easily dry out and become ineffective on the anode side of the membrane if the water which is transported to the cathode along with the protons is not replenished. Replenishment must occur by humidification of the hydrogen-containing fuel gas stream which is fed to the anode side of the fuel cell. In addition, the oxygen-containing oxidant gas stream fed to the cathode is humidified prior to introducing the oxidant stream into the cathode side of the fuel cell in order that the heat of reaction within the fuel cell will not evaporate sufficient water from the cathode so as to cause it to dry out.

In fuel cells employing hydrogen as the fuel and oxygen as the oxidant, the fuel can be supplied in the form of substantially pure hydrogen or as a hydrogen-containing reformate, for example, the product of the reformation of methanol and water or the product of the reformation of natural gas. Similarly, the oxidant fed to the cathode side of the fuel cell can be provided as substantially pure oxygen or the oxidant can be air. Fuel cells are usually flooded with fuel and oxidant at constant pressure and elevated temperature. Pressure is generally controlled by a pressure regulator on the outlet side of the fuel cell. When an electrical load is placed on the circuit connecting the electrodes, fuel and oxidant are consumed in direct proportion to the electrical current drawn by the load.

In U.S. Pat. No. 4,530,886, a process is disclosed for humidifying a gaseous fuel stream for a fuel cell. This is accomplished by recirculating a hot liquid water stream in contact with a fuel gas stream. The liquid water stream is heated using the heat of condensation from the humidified stream so as to vaporize the liquid water. The dry gas stream directly contacts the liquid water in a saturator in which a portion of the water is evaporated.

In U.S. Pat. No. 4,973,530, the moisture content and temperature of hydrogen and oxygen gases is regulated throughout traverse of the gases in a fuel cell incorporating a solid polymer membrane by the use of a series of flow fields and a water transport membrane for regulating the humidity of the gas within the flow field. The evaporation of water into a control gas acts to control the fuel cell gas temperature.

In U.S. Pat. No. 5,200,278, an integrated fuel cell power generation system is disclosed in which a fuel cell stack is described as having a humidification section which imparts water vapors to an inlet hydrogen-containing fuel stream and an inlet oxygen-containing oxygen stream. The integrated power generation system includes a heat exchanger for removing heat from the coolant water stream which exits the active section of the fuel cell.

In the prior art fuel cells, incoming process gases are ordinarily humidified by flowing each gas on one side of a water vapor exchange membrane and by flowing deionized water on the opposite side of the membrane. Deionized water is preferred to prevent membrane contamination by undesired ions. In such membrane-based humidification arrangements, water is osmotically transferred across the membrane to the fuel and oxidant gases. Other nonmembrane-based humidification techniques can be employed such as exposing the incoming process gases directly to water in an evaporation chamber, or to a source of steam, in order to permit the gas to absorb the evaporated water.

For some fuel cell applications, it may be desirable to run the fuel cell under relatively high temperature and pressure conditions. The degree of humidification obtainable through the use of membrane-based devices under such conditions may be less than desirable. Further, the space requirements for equipment for typical humidification techniques may be less than desirable for certain applications such as, for example, automotive applications.

SUMMARY OF THE INVENTION

A process is disclosed for humidifying a gaseous fuel stream which is suitable for humidifying a process gas stream fed to a fuel cell in order to avoid drying out the anode and cathode of the fuel cell. In the electrochemical fuel cell system disclosed, the humidification means comprises a variable pressure water source and a static mixer. The flow transmitter for the water source is set to provide a sufficient amount of water flow to the stream of gas to be humidified, either for the fuel gas or for the oxidant gas. The combined streams of gas and water are then mixed as they subsequently flow through a static mixer, and the mixing is sufficient to increase the relative humidity of the gas. The preferred amount of water provided to the gas stream by the flow transmitter is determined by the rate of flow of the fuel gas or oxidant gas and the temperature and pressure at which these incoming process gases are reacted in the fuel cell. If desired, the flow transmitter may be attached directly to the static mixer. In another embodiment, the flow transmitter is positioned upstream of the static mixer, preferably so that the incoming water is initially and briefly flowing in a direction opposite to that of the gas, to increase the mixing of the gas and water prior to entering the static mixer.

The term "static mixer" as used herein means a device having an in-line series of static baffles which separate, recombine, and mix the stream of water and gas flowing through it sufficiently to produce a relatively homogeneous mixture thereof. The static mixer preferably has a heating means attached thereto which heats the mixer to a temperature sufficient to vaporize all or most of the water in the water/gas stream under the pressure conditions in the flow line and given the particular configuration of the static mixer (since the baffles of the mixer will atomize at least a portion of the incoming water). The static mixer is heated to a temperature in the range of from 60° C. to 140° C., preferably above 100° C. The term "variable pressure water source" means that the flow rate of water to the static mixer may be adjusted, depending on the desired amount.

In the static mixer, the incoming fuel gas or oxidant gas is humidified by the atomization of the incoming water stream. An increase in the water content of the fuel gas and the oxidant gas is accomplished at the temperature and pressure close to that at which these gases are reacted in the fuel cell. The incoming process gases are saturated and raised to a temperature of from about 70° C. to about 140° C. prior to entering the fuel cell.

Preferably, the electrical power generation system of the invention comprises at least one fuel cell having a cathode and an anode. Cations are produced at the anode from said humidified fuel stream and anions are produced at a cathode. The anions react with said cations to form water at the cathode. An ion-exchange membrane is interposed between the anode and cathode. The ion-exchange membrane isolates the humidified gas stream and facilitates the migration of cations from the anode to the cathode. Preferably, hydrogen and air or oxygen are used as fuel and oxidants, respectively, in the fuel cell battery. The fuel cell battery comprises at least two adjoining fuel cells having membranes, anodes, and cathodes all in intimate electrical contact. Most preferably, the fuel cell membrane is a solid polymer membrane for proton transport between anodes and cathodes.

BRIEF DESCRIPTION OF THE DRAWING

The FIGURE is a schematic diagram of one embodiment of the disclosed humidification system for a fuel cell.

DESCRIPTION OF THE PREFERRED EMBODIMENT

Figure 1:
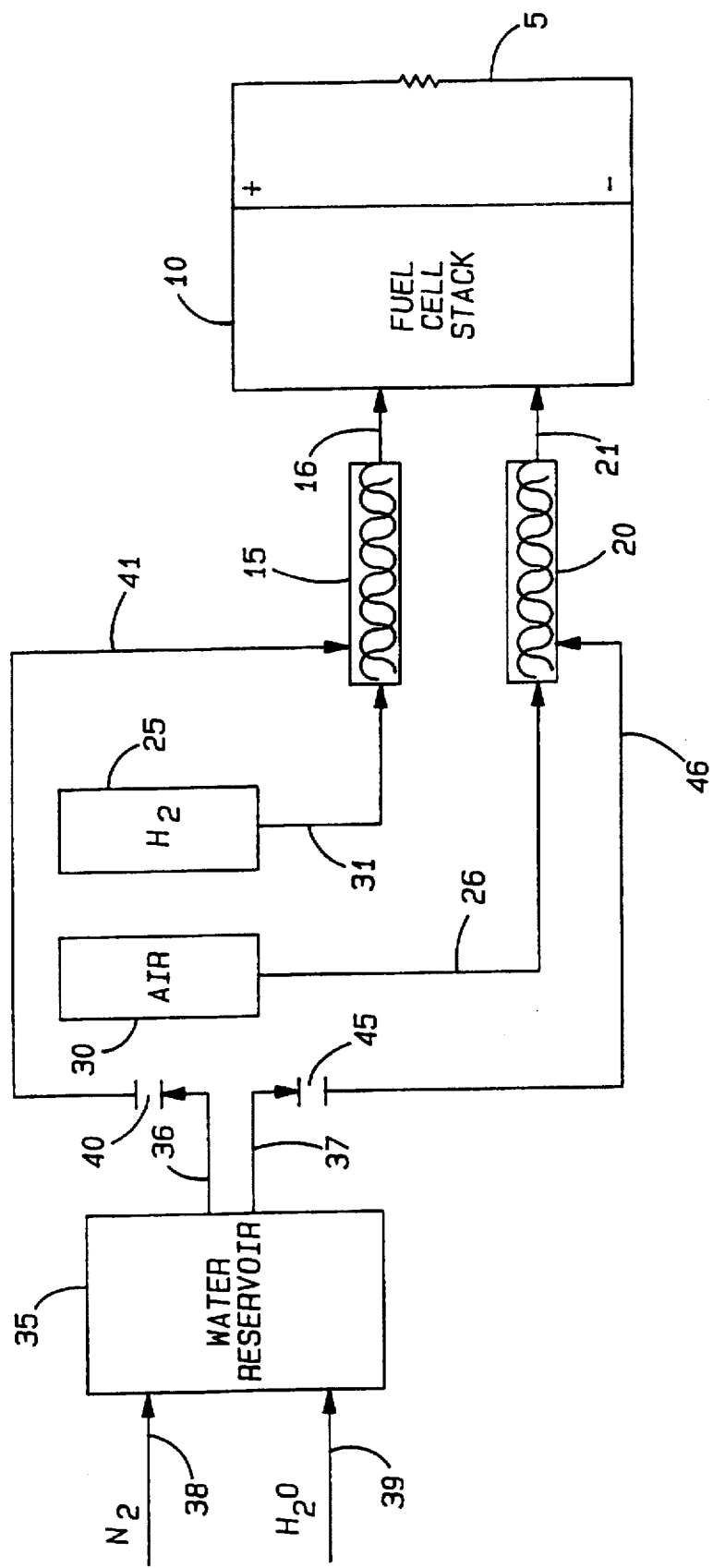

Turning to the FIGURE, a fuel cell stack 10 connected to circuit 5 is fed with humidified hydrogen gas through line 16 and humidified air through line 21. The humidified hydrogen gas is saturated with water in static mixer 15 in which the temperature of the saturated gas is raised to the temperature at which the fuel cell operates, utilizing a heat exchanger, which is not shown. The required amount of water to saturate the oxidant, air, is fed through line 46 to static mixer 20. The air is fed from reservoir 30 through line 26 to static mixer 20 where a saturated mixture of water and air is heated to the temperature at which the fuel cell stack operates by a heat exchanger, which is not shown. The required amount of water to saturate the hydrogen gas is fed to static mixer 15 through line 41 and the hydrogen fuel gas is fed from reservoir 25 through line 31 to static mixer 15. The required amount of water to saturate the hydrogen fuel gas is a function of the flow rate and the temperature and vapor pressure at which the incoming process gas is reacted in the fuel cell. This required amount of water is metered in flow transmitter 40 which is fed with water under pressure through line 36 from water reservoir 35. Similarly, the required amount of water to saturate the air fed from reservoir 30 is fed through line 37, from reservoir 35 to static mixer 20 by way of line 46. This amount of water is a function of the temperature and vapor pressure at which the incoming process gas is reacted in the fuel cell. The required amount of water fed through line 46 is metered by flow transmitter 45 which is fed with water under pressure by line 37 from water reservoir 35. Water under pressure is fed to reservoir 35 through line 39. Nitrogen under pressure is fed through line 38 to reservoir 35. Preferably, the electrical power generating system of the invention utilizes a fuel cell in which hydrogen gas is the fuel and air or oxygen is an oxidant. A solid polymer membrane is, preferably, utilized for proton transport between the anodes and cathodes of the fuel cell.

Once the flow rate of the incoming fuel gas or oxidant is known and the temperature at which the fuel cell is to be operated is known, the preferred amount of water required to saturate the fuel or oxidant gas can be determined by reference to standard tables provided in *CRC Handbook of Chemistry and Physics*, 65th Edition (1984–1985). This amount of water determines the flow rate of water to be added to static mixers 15 and 20 in order to provide the required volume of water necessary to saturate the incoming fuel gas and oxidant gas. If a fully-saturated gas is not required, the flow rate of water may be reduced accordingly. Representative amounts of water necessary to saturate a gas at various gas flow rates are shown in the following table.

analog-to-digital electronics board located in the module and are converted to a digital format by a microprocessor. The electronic module contains a microcomputer, memory, output, and user-interface circuitry. The microcomputer controls the operation of the flow transmitter.

The static mixer employed in the process of the invention can have a heating device attached thereto, such as an integral electric heater or a heat exchanger, to raise the temperature of the gas and water in the mixer. The temperature of the interior surface of the static mixer is preferably maintained at about 2° C. to about 5° C. above the operating temperature of the fuel cell The static mixers 15 and 20 are fed with water through lines 41 and 46 from flow transmitters 40 and 45. The water is injected into the tube into which the incoming process fuel and oxidant gases enter. The atomization of the water fed to static mixers 15 and 20 occurs by injecting the water through a side stream valve into static mixers 15 and 20.

The temperature of, pressure drop across, and configuration of, the static mixer (as well as the temperature, pressure

| | | SATURATED AQUEOUS VAPOR TABLE | | | | | | | |
| | | Water (g/min) to Saturate at Various Gas Flow Rates | | | | | | | |
| Temperature (Degrees C.) | Pressure (mmHg) | 2 (L/min) | 4 (L/min) | 6 (L/min) | 8 (L/min) | 10 (L/min) | 15 (L/min) | 20 (L/min) | 25 (L/min) |
| --- | --- | --- | --- | --- | --- | --- | --- | --- | --- |
| 60 | 149.4 | 0.3 | 0.6 | 0.9 | 1.3 | 1.6 | 2.4 | 3.2 | 3.9 |
| 65 | 187.5 | 0.4 | 0.8 | 1.2 | 1.6 | 2.0 | 3.0 | 4.0 | 5.0 |
| 70 | 233.7 | 0.5 | 1.0 | 1.5 | 2.0 | 2.5 | 3.7 | 4.9 | 6.2 |
| 75 | 289.1 | 0.6 | 1.2 | 1.8 | 2.4 | 3.1 | 4.6 | 6.1 | 7.6 |
| 80 | 355.1 | 0.8 | 1.5 | 2.3 | 3.0 | 3.8 | 5.6 | 7.5 | 9.4 |
| 85 | 433.6 | 0.9 | 1.8 | 2.8 | 3.7 | 4.6 | 6.9 | 9.2 | 11.5 |
| 95 | 633.9 | 1.3 | 2.7 | 4.0 | 5.4 | 6.7 | 10.1 | 13.4 | 16.8 |

The flow transmitters 40 and 45 can be conventional analog flow transmitters or microprocessor-based flow transmitters, each well known to those skilled in this art. Utilizing the flow transmitter, process water pressure is transmitted to an isolating diaphragm and fill fluid passes to a sensing diaphragm in the center of a capacitance cell. Any difference in pressure on the isolating diaphragm causes a change in the position of the sensing diaphragm. Capacitor plates on both sides of the sensing diaphragm detect the position of the sensing diaphragm. The capacitors between the sensing diaphragm and the capacitor plates measure pressure electronically. This is converted to a digital format. While the pressure signal is in this format, the microprocessor corrects it based upon stored characterization values. The corrected digital signals, in engineering units is available for readout and transmission to suitable digital interface devices. This digital representation is then converted to a 4–20 milliamp output signal dependent upon the configuration of the flow transmitter. The sensor module of the flow transmitter contains a self-contained sensor module that can be mated to any electronic board. The sensor module contains a capacitance pressure cell that is isolated mechanically, electrically, and thermally from the process medium and the external environment. Mechanical isolation is achieved by moving the capacitor cell to a position in the neck of the electronic housing. The cell is connected to the process isolators via pressure transport tubes. This design relieves stress on the cell caused by line pressure, allowing the sensor to dynamically self-compensate for changes in static pressure.

During operation of the flow transmitter, analog pressure and temperature signals from the sensor modules enter the of the mixture of water and gas fed to the static mixer) are important variables which affect the ability to obtain the desired output, a humidified gas stream having a pressure, temperature, and relative humidity optimum for input into a particular fuel cell operating under a particular set of temperature and pressure conditions. However, once the desired output is identified, a range of variables for the humidification process utilizing the static mixer may be readily identified through routine experimentation. The relative humidity of the gas stream is preferably increased by at least 10 percent (that is, if the initial relative humidity were 0 percent, the final relative humidity would be at least 10 percent), more preferably at least 20 percent, most preferably at least 50 percent. The optimum pressure of the output of the static mixer will depend on the desired pressure of the incoming streams into the fuel cell. The pressure of the reactant streams in the fuel cell often depend on the structural integrity of the solid polymer electrolyte (typically a proton-exchange membrane) contained therein, but are otherwise as high as possible.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

What is claimed is:

1. A power generation device comprising (a) a fuel cell having a solid polymer electrolyte and inlets for fuel and oxidant gases to the fuel cell and (b) a means for increasing the relative humidity of either or both of such gases prior to passing through one of the inlets, said means comprising a static mixing device and a variable pressure water source upstream thereof, wherein the static mixer has a heating means connected thereto capable of maintaining the mixer at a temperature in the range of from 60° C. to 140° C.

2. The device of claim 2 wherein the static mixer is maintained at a temperature of at least 100° C.

3. A The device of claim 1 wherein at least one static mixer has a flow transmitter attached thereto which provides a water flow to the gas in an amount required to saturate the gas at the temperature and vapor pressure at which the gas is transmitted to the fuel cell.

4. The device of claim 1 wherein the relative humidity of the gas is increased by at least 10 percent.

5. The device of claim 1 wherein said fuel cell uses hydrogen gas as a fuel and air or oxygen gas as an oxidant and a solid polymer membrane for proton transport between said anode and said cathode.

6. An automobile having the power generation device of claim 1 incorporated therein.

7. A process for increasing the water content of a fuel or oxidant gas to be supplied to a fuel cell having a solid polymer electrolyte and inlets for fuel and oxidant gases, which comprises:

(a) combining the gas and water in a pressurized flow stream; and (b) transmitting the gas and water through a static mixer heated by heating means attached thereto to a temperature in the range of from 60° C., to 140° C., under conditions sufficient to increase the relative humidity of the gas.

8. The process of claim 7 wherein the temperature of the static mixer is at least 100° C.

9. The process of claim 7 wherein at least one static mixer has a flow transmitter attached thereto which provides a water flow to the gas in an amount required to saturate the gas at the temperature and vapor pressure at which the gas is transmitted to the fuel cell.

10. The process of claim 7 wherein the relative humidity of the gas is increased by at least 10 percent.

11. The process of claim 7 wherein said fuel cell uses hydrogen gas as a fuel and air or oxygen gas as an oxidant and a solid polymer membrane for proton transport between said anode and said cathode.

12. An automobile having an electrical power generation device incorporated therein comprising a fuel cell having a gas stream fed thereto, wherein the relative humidity of the gas is increased by the process of claim 7.

\* \* \* \* \*

UNITED STATES PATENT AND TRADEMARK OFFICE
CERTIFICATE OF CORRECTION

PATENT NO.   :   5,786,104
DATED        :   July 28, 1998
INVENTOR(S)  :   Lance L. Black It is certified that error appears in the above-identified patent and that said Letters Patent is hereby corrected as shown below:

Claim 2, column 7, line 7, following of claim, "2" should correctly read -- 1 --

Signed and Sealed this

Twenty-sixth Day of January, 1999

Attest:

Attesting Officer

*Acting Commissioner of Patents and Trademarks*